(12) United States Patent
Osajima

(10) Patent No.: US 12,112,206 B2
(45) Date of Patent: Oct. 8, 2024

(54) CONTROL DEVICE FOR CONTROLLING MULTIPLE APPLICATIONS BASED ON PRIORITY-BASED MESSAGE ENCRYPTION ARBITRATION

(71) Applicant: TOYOTA JIDOSHA KABUSHIKI KAISHA, Toyota (JP)

(72) Inventor: Takayuki Osajima, Chiyoda-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 434 days.

(21) Appl. No.: 17/643,283

(22) Filed: Dec. 8, 2021

(65) Prior Publication Data

US 2022/0269546 A1 Aug. 25, 2022

(30) Foreign Application Priority Data

Feb. 19, 2021 (JP) .................................. 2021-025567

(51) Int. Cl.
*G06F 9/50* (2006.01)
*B60W 60/00* (2020.01)
*G06F 9/455* (2018.01)

(52) U.S. Cl.
CPC .......... *G06F 9/5038* (2013.01); *B60W 60/00* (2020.02); *G06F 9/45533* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 11,526,175 B1* | 12/2022 | Christie | B60W 50/00 |
| 2011/0060839 A1 | 3/2011 | Ohta et al. | |
| 2012/0047509 A1* | 2/2012 | Ben-Itzhak | G06F 9/50 718/103 |
| 2017/0155703 A1* | 6/2017 | Hao | H04W 4/70 |
| 2018/0364917 A1* | 12/2018 | Ki | G06F 3/0608 |
| 2019/0123894 A1* | 4/2019 | Yuan | H04L 9/0819 |
| 2019/0205165 A1* | 7/2019 | Kani | G06F 9/546 |
| 2020/0183865 A1* | 6/2020 | Takeuchi | G06Q 10/087 |
| 2021/0101621 A1* | 4/2021 | Ide | B60W 60/001 |
| 2021/0237750 A1* | 8/2021 | Müller | B60W 50/038 |

FOREIGN PATENT DOCUMENTS

| | | |
|---|---|---|
| JP | 2004-343626 A | 12/2004 |
| JP | 2011-78090 A | 4/2011 |
| JP | 2020-64489 A | 4/2020 |

* cited by examiner

*Primary Examiner* — Adam Lee
(74) *Attorney, Agent, or Firm* — Oblon, McClelland, Maier & Neustadt, L.L.P.

(57) ABSTRACT

A control device manages multiple applications by acquiring and comparing messages they transmit and receive. It includes a storage unit that prioritizes message processing across these applications and an arbitration unit that determines the sequence for encrypting these messages based on the stored priorities.

20 Claims, 12 Drawing Sheets

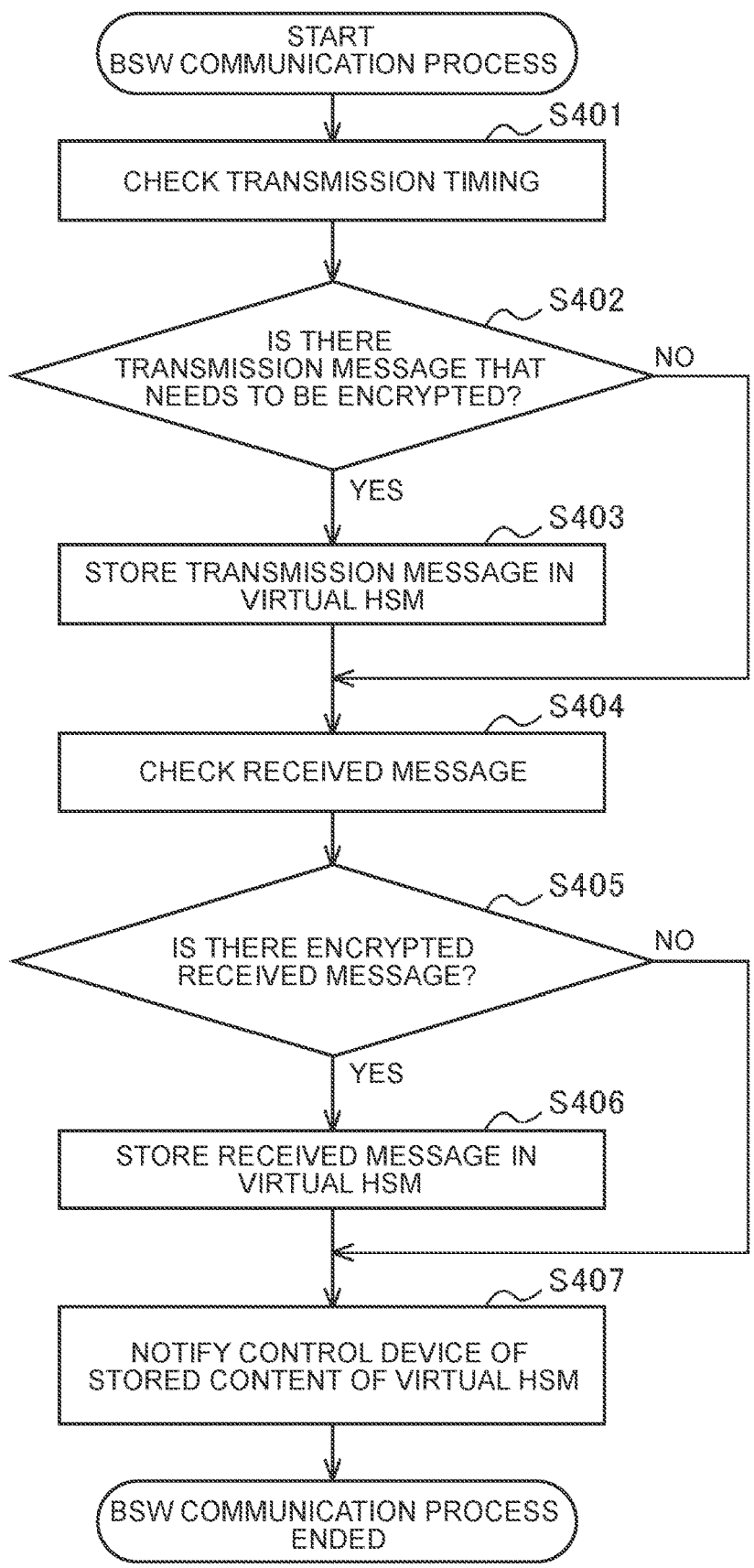

FIG. 6A

```
FIRST PRIORITY <DURING AUTONOMOUS DRIVING>

·TRANSMISSION MESSAGE > RECEIVED MESSAGE
·AUTONOMOUS DRIVING APPLICATION > OTHER APPLICATIONS
 (APP B > APPS A, C)
·CONTROL SYSTEM APPLICATION > MULTIMEDIA SYSTEM
 APPLICATION
 (APP A > APP C)
```

FIG. 6B

```
SECOND PRIORITY <DURING NON-AUTONOMOUS DRIVING>

·TRANSMISSION MESSAGE > RECEIVED MESSAGE
·CONTROL SYSTEM APPLICATION > MULTIMEDIA SYSTEM
 APPLICATION
 (APP A > APP B > APP C)
```

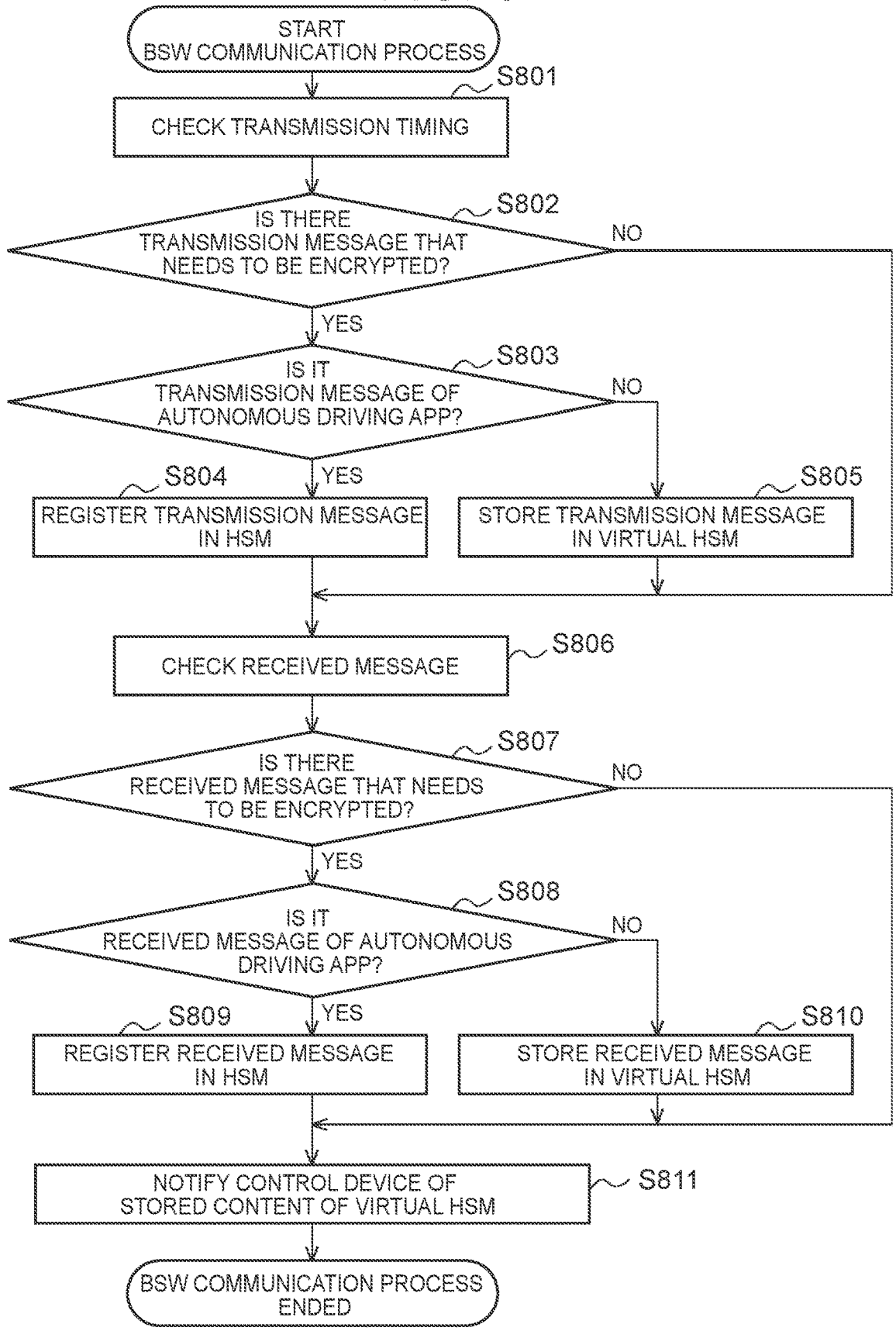

CONTROL DEVICE FOR CONTROLLING MULTIPLE APPLICATIONS BASED ON PRIORITY-BASED MESSAGE ENCRYPTION ARBITRATION

CROSS-REFERENCE TO RELATED APPLICATION

This application claims priority to Japanese Patent Application No. 2021-025567 filed on Feb. 19, 2021, incorporated herein by reference in its entirety.

BACKGROUND

1. Technical Field

The present disclosure relates to a control device mounted on a vehicle, and the like.

2. Description of Related Art

Japanese Unexamined Patent Application Publication No. 2011-078090 (JP 2011-078090 A) discloses a control device that has a plurality of execution environments of a program (application program), that is provided in a communication terminal having connection resources used for connecting to an access point to a communication network. In the control device described in JP 2011-078090 A, in a communication terminal having a plurality of program execution environments (virtual machines), permission or prohibition of a connection request from a program is appropriately controlled based on a security policy set in accordance with the execution environments. As a result, wasteful use of system resources due to unnecessary switching and communication between execution environments is suppressed.

SUMMARY

However, in the control device described in JP 2011-078090 A, the process of the messages requested from each program is executed in the order in which the requests are received. Thus, for example, when a message requires an encryption process (encryption/decryption), if hardware resources are insufficient, there is a possibility that the application in which a message process time (such as a transmission delay allowable time) is restricted will not meet performance requirements.

The present disclosure has been made in view of the above problems, and an object of the present disclosure is to provide a control device and the like that can suppress an application having a time constraint from becoming unable to satisfy performance requirements.

In order to solve the above problems, one aspect of the disclosed technology is a control device that controls an operation of a plurality of applications, the control device including: a first acquisition unit that acquires a message transmitted from the applications and a message received by the applications; a storage unit that stores a priority that at least sets a priority order for a process of the message related to the plurality of applications; and an arbitration unit that arbitrates an order of an encryption process of the message acquired by the first acquisition unit based on the priority stored by the storage unit.

According to the control device of the present disclosure, since the order of the encryption process of the messages is arbitrated based on a predetermined priority, it is possible to suppress a time-constrained application from not being able to satisfy performance requirements.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart of a BSW communication process according to a first process example executed by the virtual machine;

FIG. 6A is a diagram showing an example of priorities stored in the control device;

FIG. 6B is a diagram showing an example of priorities stored in the control device;

FIG. 8 is a flowchart of a basic software (BSW) communication process according to a second process example executed by the virtual machine;

DETAILED DESCRIPTION OF EMBODIMENTS

In a structure in which a virtualization technology such as a hypervisor is used to consolidate and integrate a plurality of electronic control units (ECUs) into one high-performance processor, by providing an arbitration function in a virtual environment and determining a message process order based on the priority given in advance, the control device of the present disclosure suppresses non-achievement of the message process performance requirement due to the lack of security function provided by a hardware.

Hereinafter, an embodiment of the present disclosure will be described in detail with reference to the drawings.

Embodiment

Configuration

Figure 1:
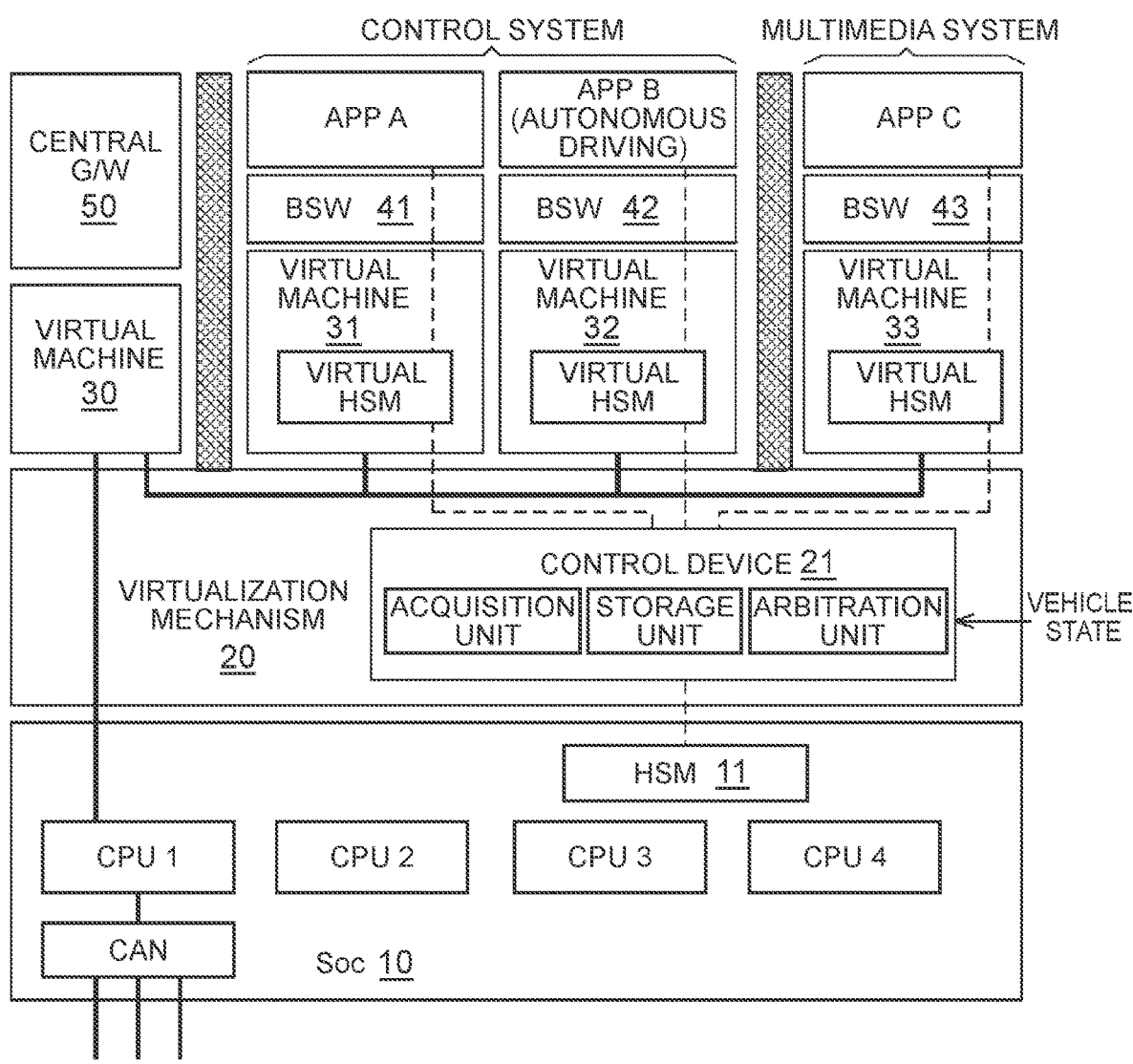
FIG. 1 is a block diagram showing a schematic configuration of a virtualization system including a control device according to an embodiment of the present disclosure.

FIG. 1 is a block diagram showing a schematic configuration of a virtualization system including a control device 21 according to an embodiment of the present disclosure. The virtualization system illustrated in FIG. 1 includes an SoC 10, a virtualization mechanism 20, virtual machines 30 to 33, BSW 41 to 43, a central G/W 50, and applications (apps) A to C in its configuration. In the present embodiment, the operation will be described with reference to an example in which the virtualization system is mounted on a vehicle capable of autonomous driving.

The system-on-a-chip (SoC) 10 is a high-performance processor in which a plurality of central processing units (CPUs) 1 to 4, a communication interface such as a controller area network (CAN), and a hardware security module (HSM) 11 are installed on (built in) a chip. The HSM 11 is hardware having tamper resistance for protecting an encryption key, and performs key storage, encryption/decryption calculation (encryption process) using the key, key generation, random number generation, and the like.

The virtualization mechanism 20 is software that runs on the SoC 10 such as a hypervisor, and realizes the plurality of virtual machines 30 to 33. The virtualization mechanism 20 enables the physical resources of the SoC 10, that is, CPUs 1 to 4, the CAN, and the HSM 11 to be shared (allocated) by the plurality of virtual machines 30 to 33. The virtualization mechanism 20 of the present embodiment operates as the control device 21 that acquires a message (transmission, reception) from the virtual HSMs provided in each of the virtual machines 31 to 33 (acquisition unit), acquires the state of the vehicle from equipment mounted on the vehicle that is not shown (acquisition unit), and based on the priority (storage unit) in which the processing order is set in advance and the state of the vehicle, arbitrates the order of messages (transmission, reception) registered in the HSM 11 (arbitration unit).

The virtual machines (VMs) 30 to 33 are virtualized computers operating on the virtualization mechanism 20. Each virtual machine can behave like a single computer hardware, simulating the behavior of a computer. A basic software (B SW) 41 including an operating system (OS) and a communication function is mounted on the virtual machine 31, and an application A (app A) that is a control system other than a control system related to autonomous driving is mounted on the BSW 41. The BSW 42 is mounted on the virtual machine 32, and the autonomous driving application B (app B) for autonomous driving that is a control system is mounted on the BSW 42. The BSW 43 is mounted on the virtual machine 33, and the application C (app C) related to a multimedia system is mounted on the BSW 43. The virtual machine 30 is equipped with a central gateway (G/W) 50 that controls message relay. The virtual machine 30 executes transmission and reception of a message via a network such as a CAN with applications A to C connected via the virtual machines 31 to 33. Further, the virtual machines 31 to 33 of the present embodiment each have a virtual HSM. This virtual HSM is a buffer that temporarily stores a transmission message that needs to be encrypted by the HSM 11 in each application and a received message that needs to be decrypted by the HSM 11 in each application.

Among the messages transmitted from the applications A to C, messages requiring high security are encrypted by the HSM 11 and then transmitted to the network. Further, among the messages received by the applications A to C, the encrypted messages are decrypted by the HSM 11 and then transmitted to each application.

In the example of FIG. 1, a configuration including four virtual machines 30 to 33 is shown. However, the configuration is not limited to this. Further, the number and types of applications implemented by each virtual machine 30 to 33 are not limited to those shown in the figure. For example, a plurality of applications may be implemented on one virtual machine, and the types of the plurality of applications may be different (for example, a control system (autonomous driving) and a multimedia system).

When a plurality of transmission messages requiring encryption in the HSM 11 and a plurality of received messages requiring decryption in the HSM 11 are requested, the control device 21 of the present disclosure preferably controls the process order of the plurality of messages as follows.

Control

The control performed by each configuration of the virtualization system of the present disclosure will be described with reference to FIGS. 2 to 9B.

1 Basic Process (Common to the First and Second Process Examples)

1-1 Virtualization Mechanism Process

Figure 2:
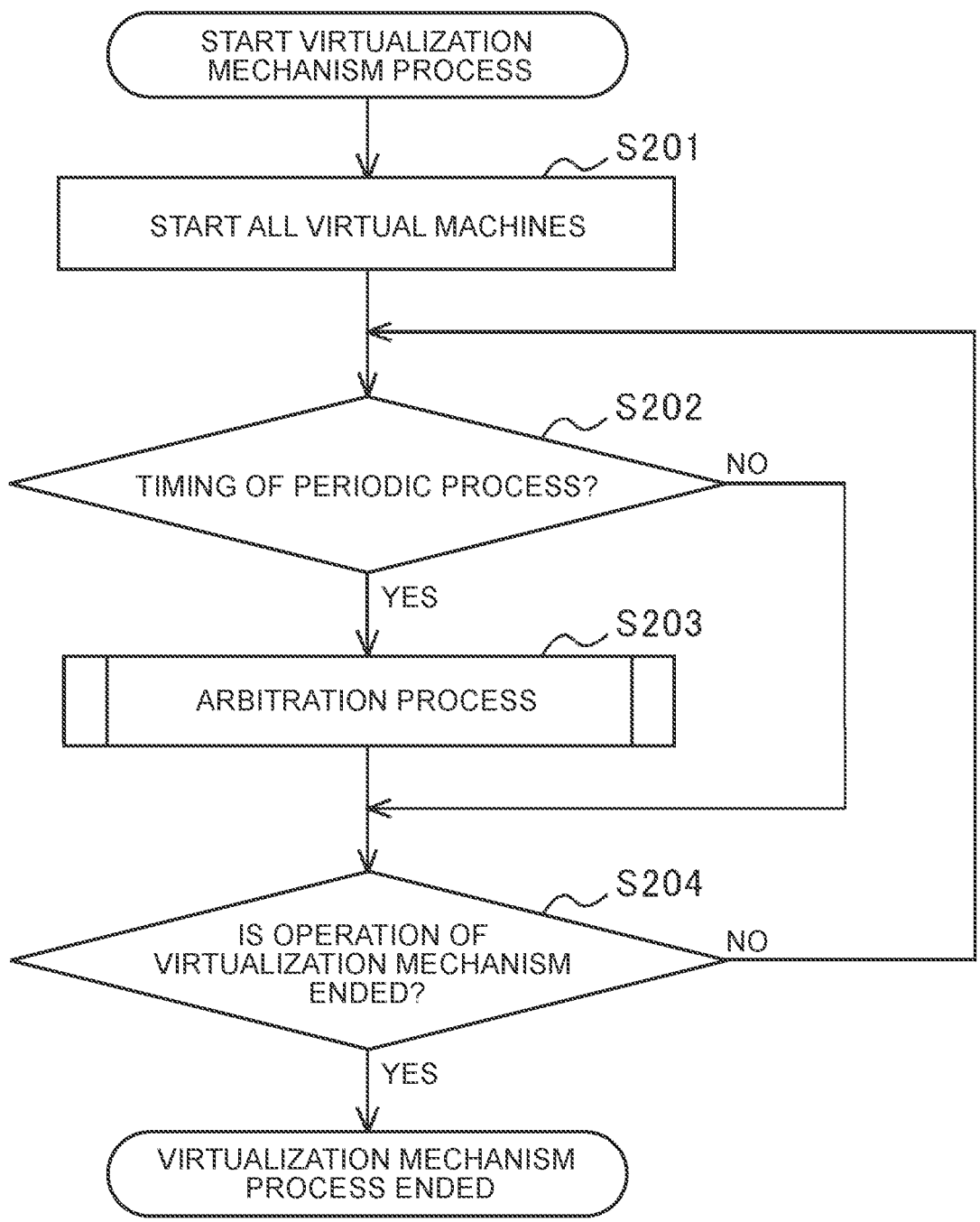
FIG. 2 is a flowchart of a virtualization mechanism process executed by the virtualization mechanism.

FIG. 2 is a flowchart showing a procedure of a virtualization mechanism process executed by the virtualization mechanism 20. The virtualization mechanism process illustrated in FIG. 2 is started when the power of the virtualization system is turned on.

Step S201

The virtualization mechanism 20 starts all the virtual machines 30 to 33. As a result, a virtual machine process (FIG. 3) described later operates in parallel with the virtualization mechanism process. When all the virtual machines 30 to 33 are started, the process proceeds to step S202.

Step S202

The virtualization mechanism 20 determines whether it is time to execute a process that is periodic (periodic process). This cycle is a cycle for confirming whether a message is stored in the virtual HSMs of the virtual machines 31 to 33, and can be set to, for example, 1 ms. When it is the timing of the periodic process (step S202, YES), the process proceeds to step S203, and when it is not the timing of the periodic process (step S202, NO), the process proceeds to step S204.

Step S203

Figure 5A:
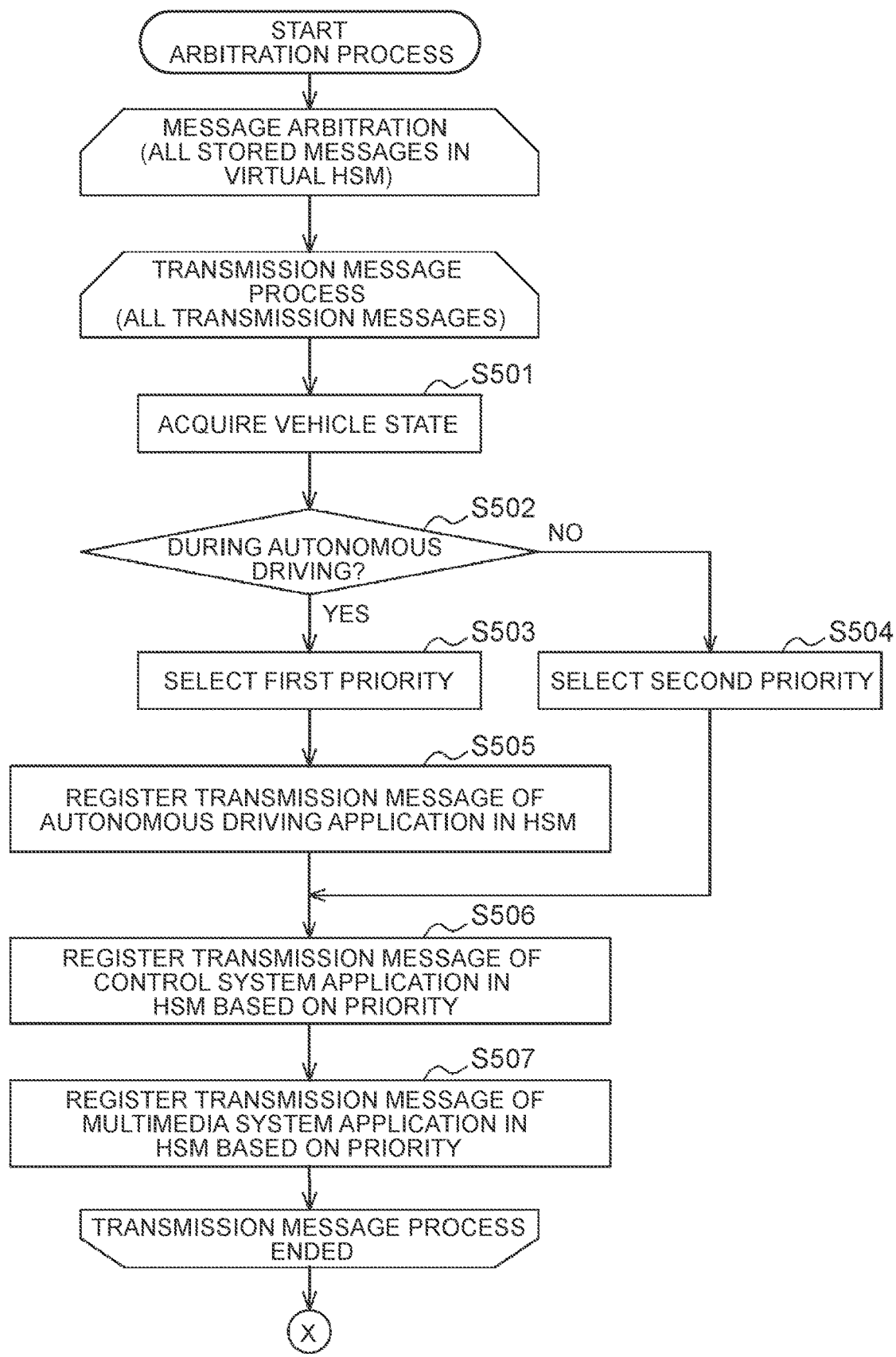
FIG. 5A is a flowchart of an arbitration process according to the first process example executed by the control device.
Figure 5B:
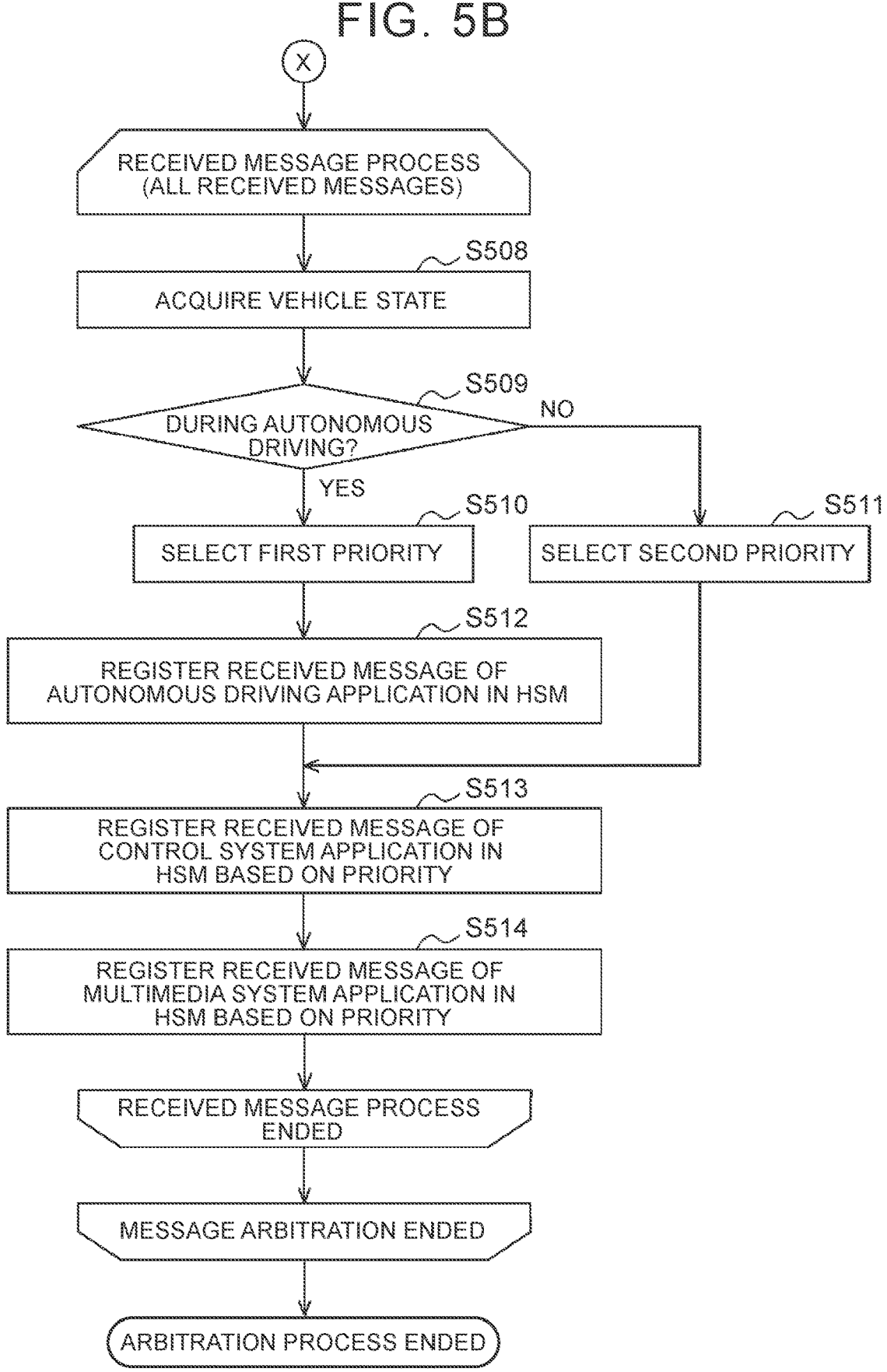
FIG. 5B is a flowchart of the arbitration process according to the first process example executed by the control device.

The virtualization mechanism 20 executes an arbitration process (FIGS. 5A and 5B). This arbitration process will be described later. When the arbitration process is completed, the process proceeds to step S204.

Step S204

The virtualization mechanism 20 determines whether to end its own operation. As a case of ending its own operation, a case where the power of the virtualization system is turned off can be exemplified. When the operation of the virtualization mechanism 20 is ended (step S204, YES), the present virtualization mechanism process is ended, and when the operation of the virtualization mechanism 20 is not ended (step S204, NO), the process proceeds to step S202.

1-2 Virtual Machine Process

Figure 3:
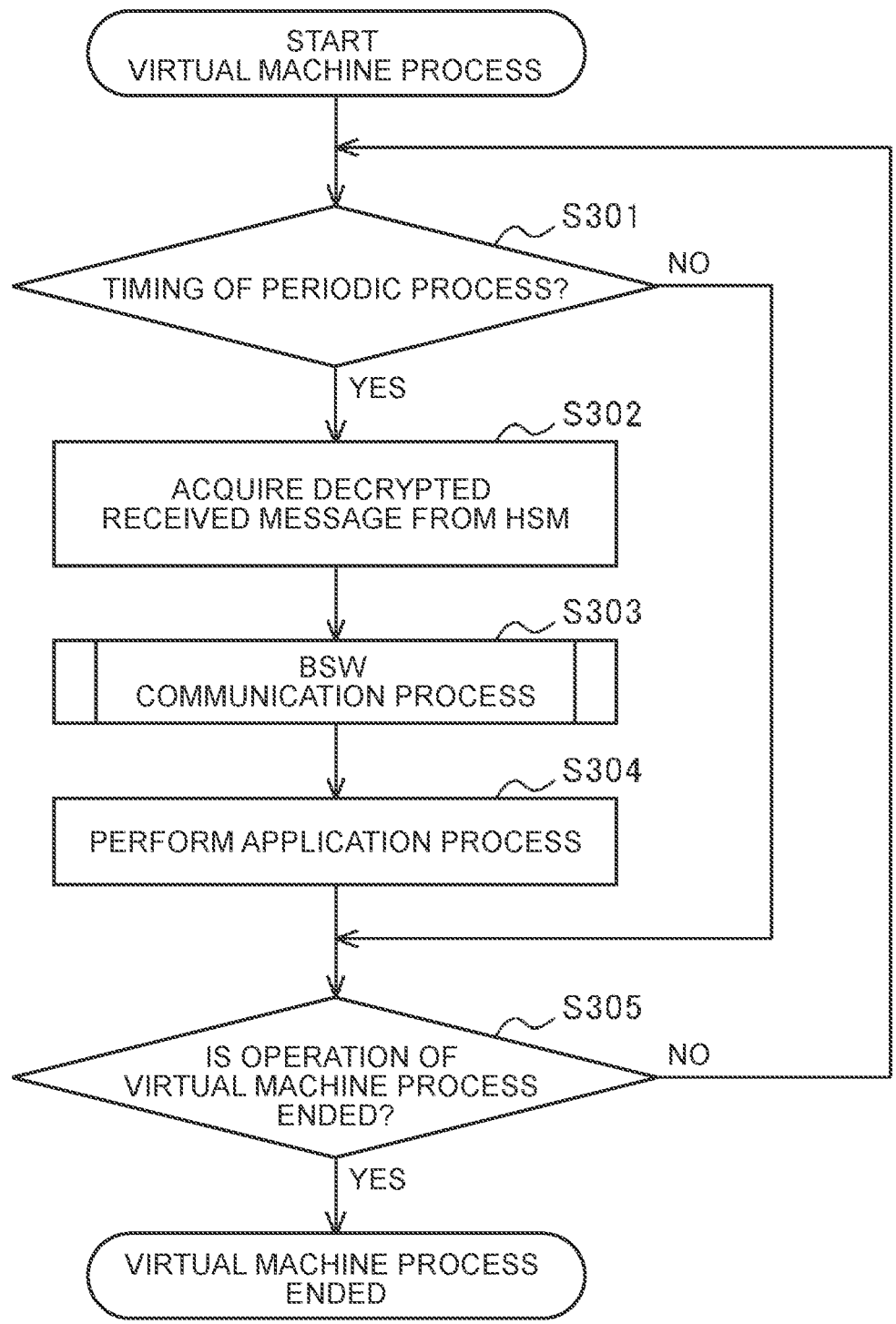
FIG. 3 is a flowchart of a virtual machine process executed by a virtual machine.

FIG. 3 is a flowchart showing a procedure of the virtual machine process executed by each of the virtual machines 31 to 33. The virtual machine process illustrated in FIG. 3 is started when the virtual machines 31 to 33 are started by the process of the virtualization mechanism 20. Although the virtual machine process by the virtual machine 31 will be described below as a representative, the same applies to the virtual machine process by the virtual machines 32 and 33.

Step S301

The virtual machine 31 determines whether it is time to execute the process that is periodic (periodic process). As described above, this cycle is a cycle for confirming whether a message is stored in the virtual HSMs of the virtual machine 31, and can be set to, for example, 1 ms. When it is the timing of the periodic process (step S301, YES), the process proceeds to step S302, and when it is not the timing of the periodic process (step S301, NO), the process proceeds to step S305.

Step S302

When the received message decrypted in the previous periodic process remains in the HSM 11, the virtual machine 31 acquires the received message from the HSM 11. When the decrypted received message is acquired, the process proceeds to step S303.

Step S303

The virtual machine 31 executes a BSW communication process (FIG. 4). The BSW communication process will be described later. When the BSW communication process is completed, the process proceeds to step S304.

Step S304

The virtual machine 31 passes the decrypted received message to each application A, and executes an application process based on the received message. When the application process is executed, the process proceeds to step S305.

Step S305

The virtual machine 31 determines whether to end its own operation. As a case of ending its own operation, a case where the power of the virtualization system is turned off can be exemplified. When the operation of the virtual machine 31 is ended (step S305, YES), the present virtual machine process is ended, and when the operation of the virtual machine 31 is not ended (step S305, NO), the process proceeds to step S301.

2 First Process Example 2-1 BSW Communication Process

FIG. 4 is a flowchart showing a procedure of a BSW communication process according to the first process example executed by the virtual machines 31 to 33 using the BSWs 41 to 43. The B SW communication process according to the first process example shown in FIG. 4 is executed independently by the virtual machines 31 to 33. Although the virtual machine process by the virtual machine 31 will be described below as a representative, the same applies to the virtual machine process by the virtual machines 32 and 33.

Step S401

The virtual machine 31 confirms that it is the transmission timing at which the message may be transmitted. When the transmission timing is confirmed, the process proceeds to step S402.

Step S402

The virtual machine 31 determines whether there is a transmission message that needs to be encrypted that is requested by the application A. When there is a transmission message that needs to be encrypted (step S402, YES), the process proceeds to step S403, and when there is no transmission message that needs to be encrypted (step S402, NO), the process proceeds to step S404.

Step S403

The virtual machine 31 stores the transmission message that needs to be encrypted in the virtual HSM. When the transmission message is stored in the virtual HSM, the process proceeds to step S404.

Step S404

The virtual machine 31 confirms the presence or absence of the received message for the application A. When the confirmation of the received message is completed, the process proceeds to step S405.

Step S405

The virtual machine 31 determines whether there is an encrypted received message for the application A. When there is an encrypted received message (step S405, YES), the process proceeds to step S406, and when there is no encrypted received message (step S405, NO), the process proceeds to step S407.

Step S406

The virtual machine 31 stores the encrypted received message in the virtual HSM. When the received message is stored in the virtual HSM, the process proceeds to step S407.

Step S407

The virtual machine 31 notifies the control device 21 of the virtualization mechanism 20 of the content (stored content) of the message stored in the virtual HSM. When the storage content is notified to the control device 21, the BSW communication process according to the first process example ends.

Since the order in which the transmission message and the received message are stored in the virtual HSM is not particularly limited, the process for the transmission message in steps S401 to S403 and the process for the received message in steps S404 to S406 may be exchanged.

2-2 Arbitration Process

FIGS. 5A and 5B are flowcharts showing a procedure of the arbitration process according to the first process example executed by the control device 21. The process of FIG. 5A and the process of FIG. 5B are connected by connectors X and Y. The arbitration process according to the first process example shown in FIGS. 5A and 5B is executed at a predetermined cycle as shown in step S202 of FIG. 2. At the time of execution, the control device 21 acquires the stored messages from each virtual HSM of the virtual machines 31 to 33 (first acquisition unit).

In this arbitration process, the transmission message process (steps S501 to S507) and the received message process (steps S506 to S514) are performed for all the messages stored in all the virtual HSMs of the virtual machines 31 to 33.

Step S501

The control device 21 acquires the state of the vehicle (second acquisition unit). When the state of the vehicle is acquired, the process proceeds to step S502.

Step S502

The control device 21 determines whether the vehicle is in the state in which autonomous driving is being performed (during autonomous driving) based on the acquired state of the vehicle. In the case of a first state during autonomous driving (step S502, YES), the process proceeds to step S503, and in the case of a second state that is not during autonomous driving (step S502, NO), the process proceeds to step S504.

Step S503

The control device 21 selects a first priority as the priority used for arbitrating the message. As illustrated in FIG. 6A, the priority order of each message process is set in the first priority in the present embodiment. The priority order at least includes prioritizing a transmission message over a received message (prioritizing relationship of transmission and reception), and prioritizing a message requested from an application related to autonomous driving (first application) over a message requested from another application (app (second application)) (prioritizing relationship for each application/type). When the first priority is selected, the process proceeds to step S505.

Step S504

The control device 21 selects a second priority as the priority used for arbitration of the message. As illustrated in FIG. 6B, the priority order of each message process is set in the second priority in the present embodiment. The priority order at least includes prioritizing a transmission message over a received message (prioritizing relationship of transmission and reception), and prioritizing a message requested from an application of a control system other than autonomous driving (second application) among applications related to the control system (prioritizing relationship for each application/type). When the second priority is selected, the process proceeds to step S506.

Step S505

The control device 21 registers in the HSM 11, a transmission message of an application related to autonomous driving among one or a plurality of transmission messages stored in each virtual HSM. In the present embodiment, the transmission message that is requested by the autonomous driving application B and that is stored in the virtual HSM of the virtual machine 32 is registered in the HSM 11. As a result, the transmission message of the application related to autonomous driving is registered in the HSM 11 with the highest priority. When all the transmission messages of the application related to autonomous driving are registered in the HSM 11, the process proceeds to step S506.

Step S506

Among the one or plurality of transmission messages stored in each virtual HSM, the transmission message requested by the application related to the control system is registered in the HSM 11 based on the first priority or the second priority by the control device 21. When based on the first priority (when autonomous driving is in progress), in the present embodiment, the control device 21 registers in the HSM 11, a transmission message requested by the control system application A and stored in the virtual HSM of the virtual machine 31. In contrast, when based on the second priority (when autonomous driving is not in progress), in the present embodiment, the control device 21 first registers a transmission message that is requested by the control system application A and that is stored in the virtual HSM of the virtual machine 31 in the HSM 11, and then registers a transmission message that is requested by the autonomous driving application B and that is stored in the virtual HSM of the virtual machine 32 in the HSM 11. As a result, the transmission message having the highest priority in the control system is registered first in the HSM 11. When all the transmission messages of the control system application are registered in the HSM 11, the process proceeds to step S507.

Step S507

Among the one or plurality of transmission messages stored in each virtual HSM, the transmission message requested by the application related to the multimedia system is registered in the HSM 11 based on the first priority or the second priority by the control device 21. In the present embodiment, the control device 21 registers in the HSM 11, a transmission message that is requested by the multimedia system application C and that is stored in the virtual HSM of the virtual machine 33 regardless of whether the priority is the first priority or the second priority. As a result, the transmission message of the multimedia system application that does not need to be prioritized is registered last in the HSM 11. When all the transmission messages of the multimedia system application are registered in the HSM 11, the process proceeds to step S508.

The process of steps S501 to S507 described above is performed on all transmission messages stored in all virtual HSMs of the virtual machines 31 to 33.

Step S508

The control device 21 acquires the state of the vehicle (second acquisition unit). When the state of the vehicle is acquired, the process proceeds to step S509.

Step S509

The control device 21 determines whether the vehicle is in the state in which autonomous driving is being performed (during autonomous driving) based on the acquired state of the vehicle. In the case of the first state during autonomous driving (step S509, YES), the process proceeds to step S510, and in the case of the second state that is not during autonomous driving (step S509, NO), the process proceeds to step S511.

Step S510

The control device 21 selects a first priority as the priority used for arbitrating the message. As described above, the process order of each message is set the first priority in the present embodiment. The process order includes that the received message has a lower order than the transmission message, and that the message of the application related to autonomous driving is prioritized over the message of another application (FIG. 6A). When the first priority is selected, the process proceeds to step S512.

Step S511

The control device 21 selects a second priority as the priority used for arbitration of the message. As described above, the second priority in the present embodiment is set to the process order of each message. The process order includes that the received message has a lower order than the transmission message (FIG. 6B). When the second priority is selected, the process proceeds to step S513.

Step S512

The control device 21 registers in the HSM 11, a received message requested from an application related to autonomous driving among one or a plurality of received messages stored in each virtual HSM. In the present embodiment, the received message that is requested by the autonomous driving application B and that is stored in the virtual HSM of the virtual machine 32 is registered in the HSM 11. As a result, the received message of the autonomous driving application among all the received messages is prioritized to be registered in the HSM 11. When all the received messages of the autonomous driving application are registered in the HSM 11, the process proceeds to step S513.

Step S513

Among the one or plurality of received messages stored in each virtual HSM, the received message requested by the application related to the control system is registered in the HSM 11 based on the first priority or the second priority by the control device 21. When based on the first priority (when autonomous driving is in progress), in the present embodiment, a received message requested by the control system application A and stored in the virtual HSM of the virtual machine 31 is registered in the HSM 11. In contrast, when based on the second priority (when autonomous driving is not in progress), in the present embodiment, a received message that is requested by the control system application A and that is stored in the virtual HSM of the virtual machine 31 is registered first in the HSM 11, and a received message that is requested by the autonomous driving application B and that is stored in the virtual HSM of the virtual machine 32 is registered in the HSM 11. As a result, the received message having the highest priority in the control system application is registered first in the HSM 11. When all the received messages of the control system application are registered in the HSM 11, the process proceeds to step S514.

Step S514

Among the one or plurality of received messages stored in each virtual HSM, the received message requested by the application related to the multimedia system is registered in the HSM 11 based on the first priority or the second priority by the control device 21. In the present embodiment, the received message that is requested by the multimedia system application C and that is stored in the virtual HSM of the virtual machine 33 is registered in the HSM 11 in regardless of whether the priority is the first priority or the second priority. As a result, the received message of the multimedia system application that does not need to be prioritized is registered last in the HSM 11. When all the received messages of the multimedia system application are registered in the HSM 11, the arbitration process according to the first process example is ended.

The process of steps S508 to S514 described above is performed on all received messages stored in all virtual HSMs of the virtual machines 31 to 33.

According to the BSW communication process and the arbitration process according to this first process example, when the vehicle is being autonomously driven, the registration order of all messages in the HSM (order of encryption process) is arbitrated based on the first priority, and when the vehicle is not being autonomously driven, the registration order of all messages in the HSM (order of encryption process) is arbitrated based on the second priority. That is, the messages can be registered in the HSM 11 while prioritizing the transmission message requested by each application over the received message, and prioritizing the message requested by the application related to autonomous driving over the message requested by other applications. As a result, it is possible to realize a preferable order arbitration of the message encryption process in which the state of the vehicle and the process delay allowed by each application are comprehensively determined.

Figure 7:
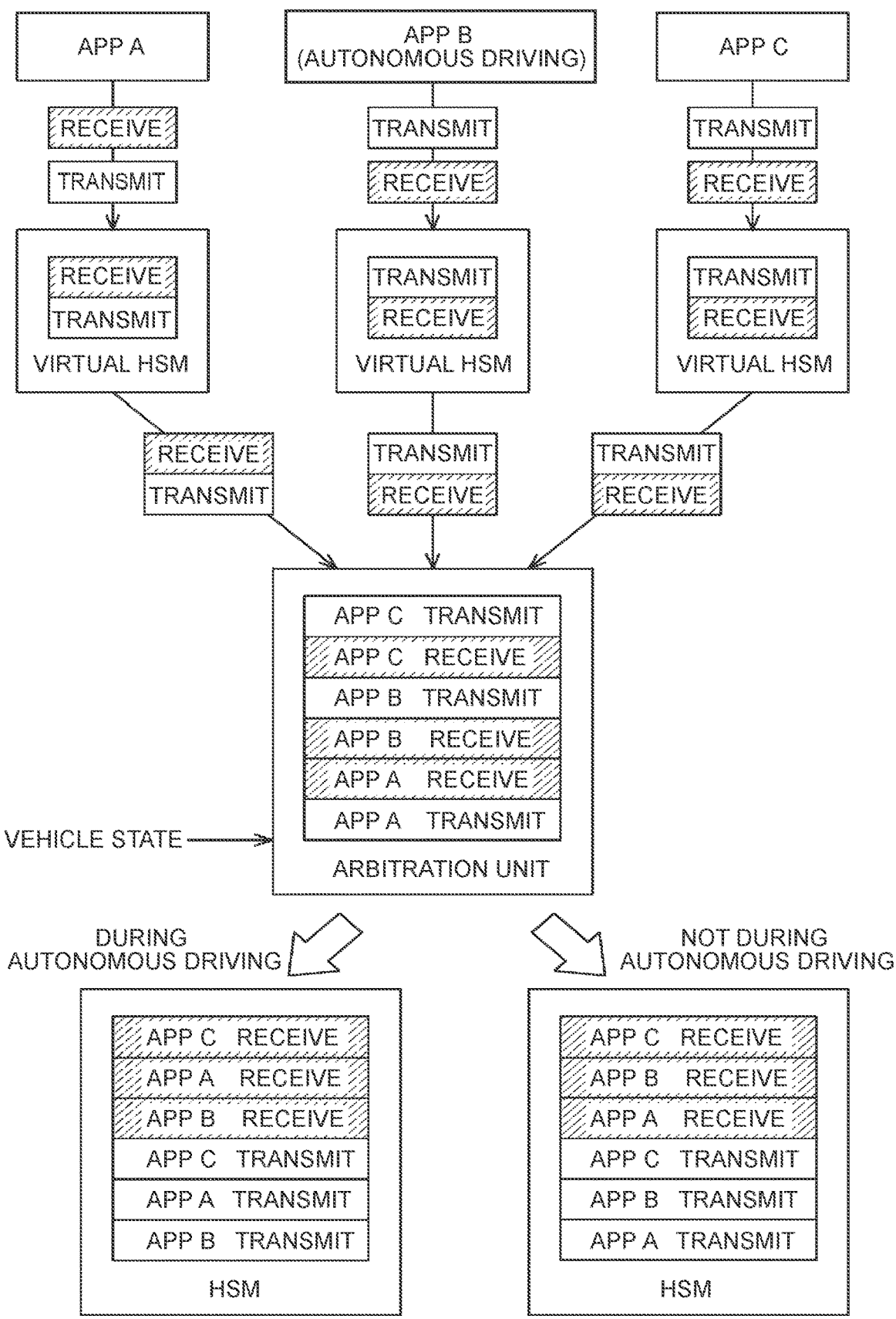
FIG. 7 is a diagram showing an example of a message of each application registered in a hardware security module (HSM) based on the arbitration process according to the first process example.

FIG. 7 shows an example of a transmission message and a received message of each application registered in the HSM 11 based on the arbitration process according to the first process example. The messages temporarily stored in each virtual HSM of the virtual machines 31 to 33 are passed to the arbitration unit of the control device 21, and then arbitration of the process order based on the state of the vehicle and the priority is performed in the arbitration unit. Then, as a result of arbitration, when autonomous driving of the vehicle is in progress, the messages are registered in the HSM 11 in the order of transmission message>received message, and application B>application A>application C, based on the first priority (lower left in FIG. 7). In contrast, as a result of arbitration, when autonomous driving of the vehicle is not in progress, the messages are registered in the HSM 11 in the order of transmission message>received message and application A>application B>application C, based on the second priority (lower right in FIG. 7).

3 Second Process Example

As described above, the virtualization mechanism process (FIG. 2) and the virtual machine process (FIG. 3) operate in parallel. Thus, there is a possibility that the periodic process executed in each process is delayed by a maximum of one cycle (for example, 1 ms) depending on the process timing. Therefore, in this second process example, when there is an application in which the process delay cannot be allowed, such as an application related to autonomous driving, a process that can eliminate the influence of the process delay will be described.

3-1 BSW Communication Process

FIG. 8 is a flowchart showing a procedure of the BSW communication process according to the second process example executed by the virtual machines 31 to 33 using the BSWs 41 to 43. The BSW communication process according to the second process example shown in FIG. 8 is executed independently by the virtual machines 31 to 33.

Step S801

The virtual machines 31 to 33 each confirm that it is the transmission timing at which the message may be transmitted. When the transmission timing is confirmed, the process proceeds to step S802.

Step S802

The virtual machines 31 to 33 each determine whether there is a transmission message that needs to be encrypted that is requested by the applications A to C. When there is a transmission message that needs to be encrypted (step S802, YES), the process proceeds to step S803, and when there is no transmission message that needs to be encrypted (step S802, NO), the process proceeds to step S806.

Step S803

The virtual machines 31 to 33 determine whether a transmission message that needs to be encrypted is a transmission message from the autonomous driving application. In the configuration of the present embodiment, since only one application is implemented on each virtual machine, for the virtual machines 31 and 33, it is always determined that a transmission message that needs to be encrypted is not a transmission message from the autonomous driving application, and for the virtual machine 32, it is always determined that a transmission message that needs to be encrypted is a transmission message from the autonomous driving application B. In contrast, when a plurality of applications of different types such as the control system (autonomous driving) and the multimedia system are implemented on one virtual machine, the subsequent process is allocated in accordance with the determination in step S803. When a transmission message that needs to be encrypted is a transmission message from the autonomous driving application (step S803, YES), the process proceeds to step S804, and when a transmission message that needs to be encrypted is not a transmission message from the autonomous driving application (step S803, NO), the process proceeds to step S805.

Step S804

The virtual machines 31 to 33 register a transmission message from the autonomous driving application in the HSM 11. In the configuration of the present embodiment, only the virtual machine 32 directly registers a transmission message in the HSM 11 without going through the virtual HSM. When the transmission message is registered in the HSM 11, the process proceeds to step S806.

Step S805

The virtual machines 31 to 33 each store a transmission message that needs to be encrypted in the virtual HSM. In the configuration of the present embodiment, the virtual machines 31 and 33 store the transmission message in the virtual HSM. When the transmission message is stored in the virtual HSM, the process proceeds to step S806.

Step S806

The virtual machines 31 to 33 each confirm the presence or absence of the received message for the applications A to C. When the confirmation of the received message is completed, the process proceeds to step S807.

Step S807

The virtual machines 31 to 33 each determine whether there is the encrypted received message for the applications A to C. When there is an encrypted received message (step S807, YES), the process proceeds to step S808, and when there is no encrypted received message (step S807, NO), the process proceeds to step S811.

Step S808

The virtual machines 31 to 33 determine whether the encrypted received message is the received message from the autonomous driving application. In the configuration of the present embodiment, since only one application is implemented on each virtual machine, for the virtual machines 31 and 33, it is always determined that the encrypted received message is not the received message to the autonomous driving application, and for the virtual machine 32, it is always determined that the encrypted received message is the received message to the autonomous driving application B. In contrast, when a plurality of applications of different types such as the control system (autonomous driving) and the multimedia system are implemented on one virtual machine, the subsequent process is allocated in accordance with the determination in step S808. When the encrypted received message is the received message to the autonomous driving application (step S808, YES), the process proceeds to step S809, and when the encrypted received message is not the received message to the autonomous driving application (step S808, NO), the process proceeds to step S810.

Step S809

The virtual machines 31 to 33 register the received message to the autonomous driving application in the HSM 11. In the configuration of the present embodiment, only the virtual machine 32 directly registers the received message in the HSM 11 without going through the virtual HSM. When the received message is registered in the HSM 11, the process proceeds to step S811.

Step S810

The virtual machines 31 to 33 each store the encrypted received message in the virtual HSM. In the configuration of the present embodiment, the virtual machines 31 and 33 store the received message in the virtual HSM. When the received message is stored in the virtual HSM, the process proceeds to step S811.

Step S811

The virtual machines 31 to 33 each notify the control device 21 of the virtualization mechanism 20 of the content (stored content) of the message stored in the virtual HSM. When the stored content is notified to the control device 21, the BSW communication process according to this second process example is ended.

3-2 Arbitration Process

Figure 9A:
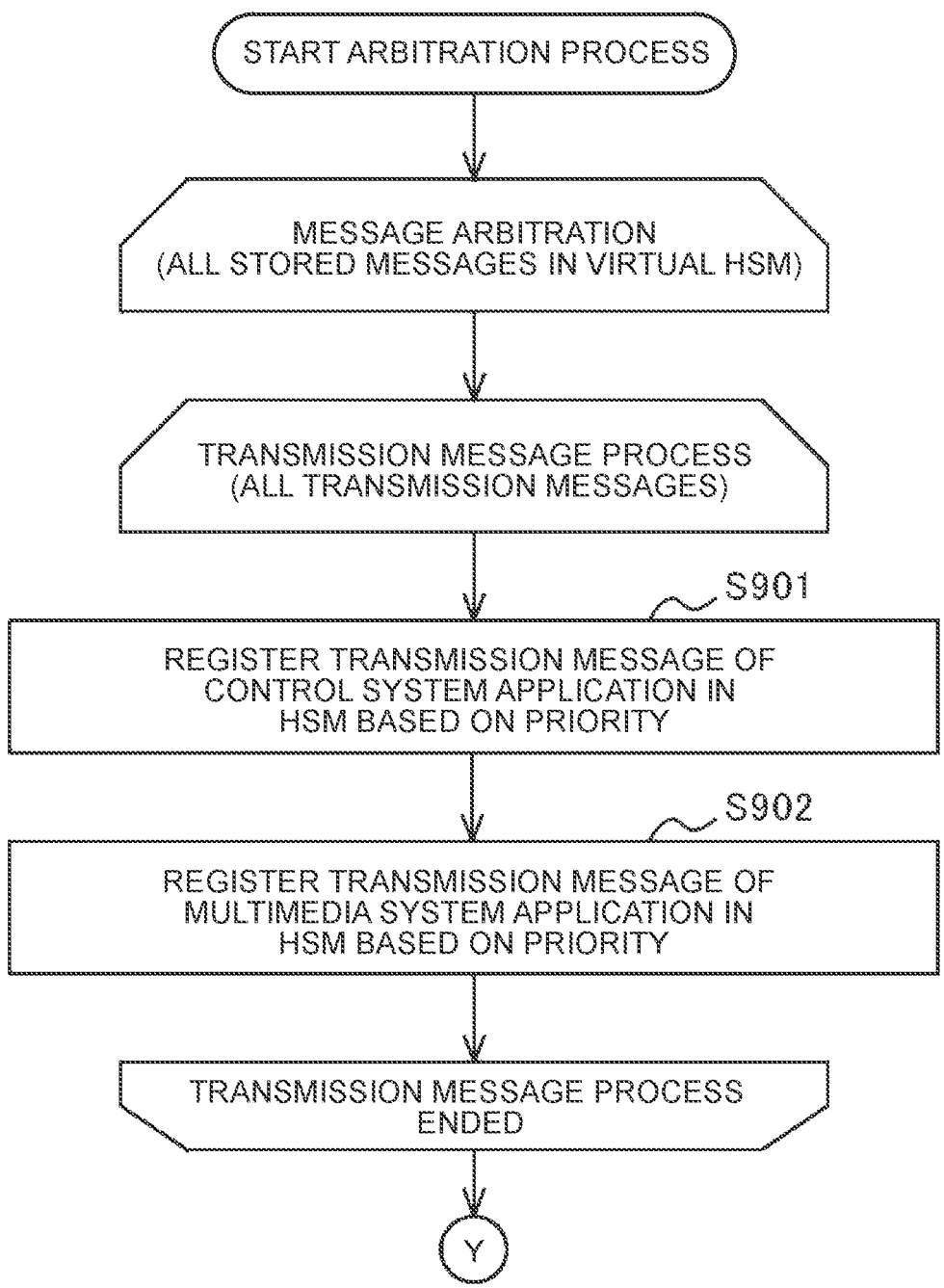
FIG. 9A is a flowchart of arbitration process according to the second process example executed by the control device.
Figure 9B:
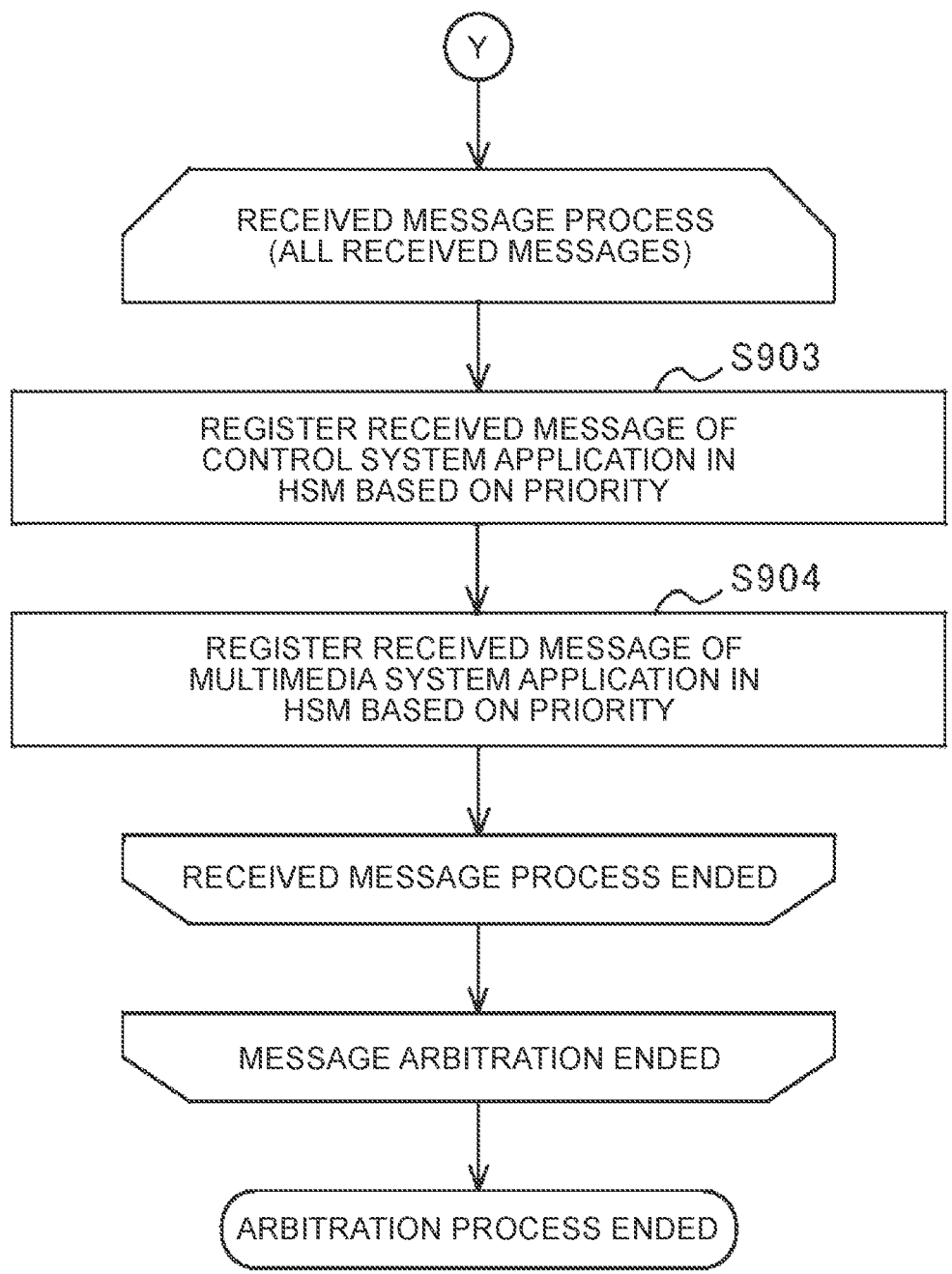
FIG. 9B is a flowchart of arbitration process according to the second process example executed by the control device.

FIGS. 9A and 9B are flowcharts showing a procedure of the arbitration process according to the second process example executed by the control device 21. The process of FIG. 9A and the process of FIG. 9B are connected by the connector Y. The arbitration process according to the second process example shown in FIGS. 9A and 9B is executed at a predetermined cycle in accordance with the execution of the BSW communication process according to the second process example shown in FIG. 8 described above.

In this arbitration process, the transmission message process (steps S901 and S902) and the received message process (steps S903 and S904) are performed for all the messages stored in all the virtual HSMs of the virtual machines 31 to 33.

Step S901

Among the one or plurality of transmission messages stored in each virtual HSM, the transmission message requested by the application related to the control system is registered in the HSM 11 based on the priority by the control device 21. The priority applied to this process may be either the first priority or the second priority described above. In the present embodiment, the control device 21 registers the transmission message, which is stored in the virtual HSM of the virtual machine 31 by request from the control system application A, by making the transmission message cut in between the transmission message of the autonomous driving application and the received message of the autonomous driving application already registered in the HSM 11. As a result, the transmission message of the control system application in the virtual HSM is registered in the HSM 11 after the transmission message of the autonomous driving application. When all the transmission messages of the control system application are registered in the HSM 11, the process proceeds to step S902.

Step S902

Among the one or plurality of transmission messages stored in each virtual HSM, the transmission message requested by the application related to the multimedia system is registered in the HSM 11 based on the first priority by the control device 21. The priority applied to this process may be either the first priority or the second priority described above. In the present embodiment, the control device 21 registers the transmission message, which is stored in the virtual HSM of the virtual machine 33 by request from the multimedia system application C, by making the transmission message cut in between the transmission message of the autonomous driving application and the received message of the control system application already registered in the HSM 11. As a result, the transmission message of the multimedia system application is registered in the HSM 11 after the transmission message of the control system application. When all the transmission messages of the multimedia system application are registered in the HSM 11, the process proceeds to step S903.

The process of steps S901 and S902 described above is performed on all transmission messages stored in all virtual HSMs of the virtual machines 31 to 33.

Step S903

Among the one or plurality of received messages stored in each virtual HSM, the received message requested by the application related to the control system is registered in the HSM 11 based on the priority by the control device 21. The priority applied to this process may be either the first priority or the second priority described above. In the present embodiment, the received message that is requested by the control system application A and that is stored in the virtual HSM of the virtual machine 31 is registered in the HSM 11 by the control device 21. As a result, the received message of the control system application in the virtual HSM is registered after the received message of the autonomous driving application already registered in the HSM 11. When all the received messages of the control system application are registered in the HSM 11, the process proceeds to step S904.

Step S904

Among the one or plurality of received messages stored in each virtual HSM, the received message requested by the application related to the multimedia system is registered in the HSM 11 based on the first priority or the second priority by the control device 21. The priority applied to this process may be either the first priority or the second priority described above. In the present embodiment, the control device 21 registers the received message, which is stored in the virtual HSM of the virtual machine 33 by request from the multimedia system application C, after the received message of the control system application already registered in the HSM 11. As a result, the received message of the multimedia system application that does not need to be prioritized is registered last in the HSM 11. When all received messages of the multimedia system application are registered in the HSM 11, the arbitration process according to the second process example is ended.

The process of steps S903 and S904 described above is performed for all received messages stored in all virtual HSMs of the virtual machines 31 to 33.

In the BSW communication process and the arbitration process according to this second process example, when autonomous driving of the vehicle is in progress, the message of the autonomous driving application is registered in the HSM with the highest priority without arbitration, and when autonomous driving of the vehicle is not in progress, the registration order of all messages in the HSM (order of encryption process) is arbitrated based on the priority. That is, the transmission message and the received message requested by the application related to autonomous driving can be registered in the HSM 11 while being prioritized over the transmission message and the received message requested by the other applications. As a result, even if there is a delay (deviation) between the periodic process of the virtualization mechanism process and the periodic process of the virtual machine process, it is possible to avoid the process delay from affecting the encryption process of the message of the application that cannot be allowed. Further, it is not necessary for the arbitration unit of the control device 21 to determine whether the state of the vehicle is during autonomous driving, and the process load of the control device 21 is reduced.

Figure 10:
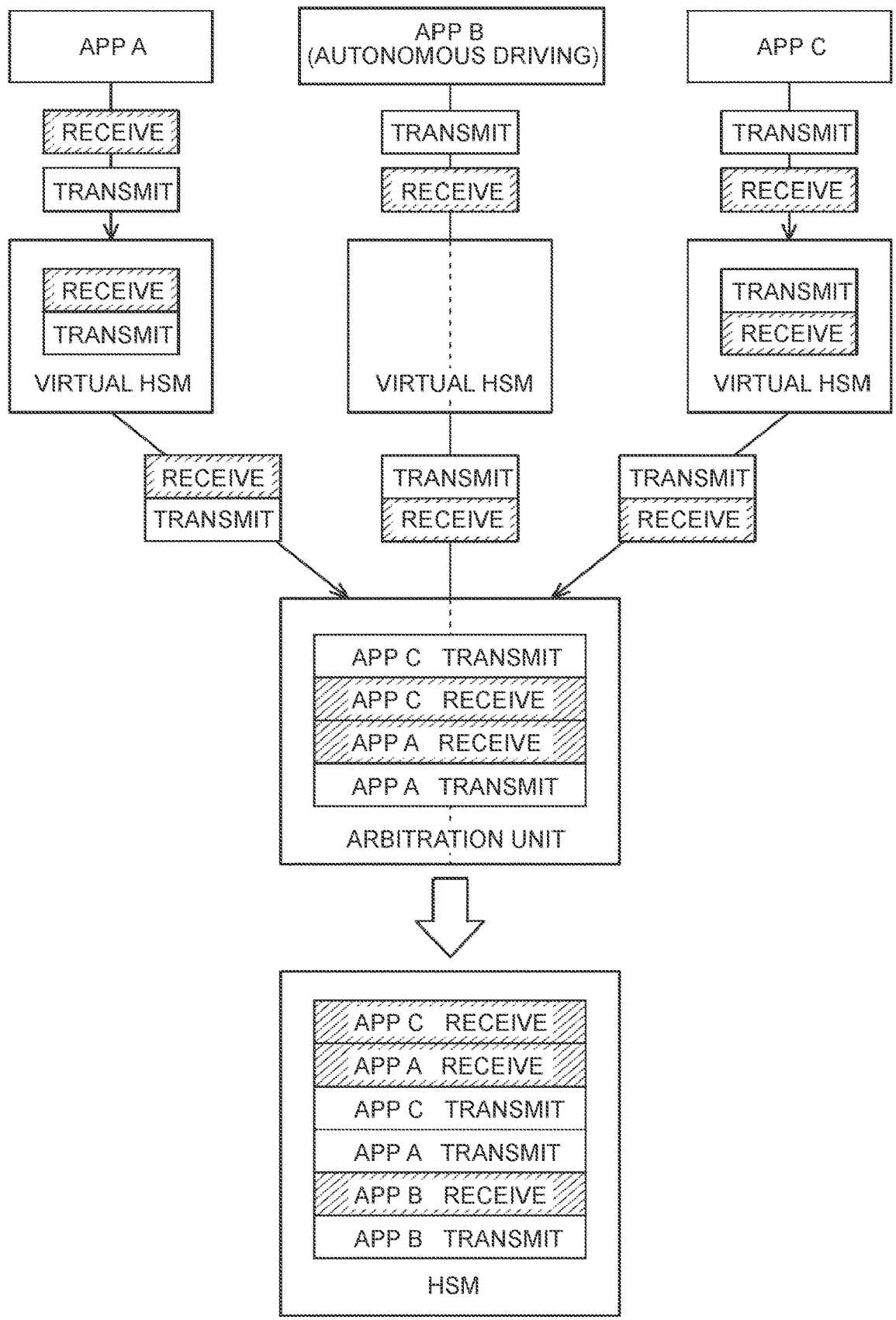
FIG. 10 is a diagram showing an example of a message of each application registered in the HSM based on the arbitration process according to the second process example.

FIG. 10 shows an example of a transmission message and a received message of each application, in which the transmission message and the received message are registered in the HSM 11 based on the arbitration process according to the second process example. The messages temporarily stored in the virtual HSM of the virtual machine 32 is directly registered in the HSM 11. The messages temporarily stored in each virtual HSM of the virtual machines 31 and 33 are passed to the arbitration unit of the control device 21, and then arbitration of the process order based on the state of the vehicle and the priority is performed in the arbitration unit. Then, as a result of arbitration, the messages are registered in the HSM 11 in the order of transmission message>received message, and application A>application C, based on the priority.

Operations and Effects

As described above, in the control device according to the embodiment of the present disclosure, the order of the encryption process of the transmission message from each application and the received message directed to each application is arbitrated based on the predetermined priority in accordance with the request of the application (such as a transmission delay allowable time). At the time of arbitration, all or part of the message from each application and the message directed to each application is stored temporarily in the virtual HSM provided in each virtual machine, and the stored plurality of messages are arbitrated based on the priority. This suppresses time-constrained applications from failing to meet performance requirements.

Further, in the control device according to the present embodiment, the priority can be changed in accordance with the state of the vehicle. Thus, it is possible to realize a control in which the encryption process of a specific application such as an application related to autonomous driving can be prioritized. In the present embodiment, as the priority, an example in which the application related to autonomous driving is given the highest priority when autonomous driving of the vehicle is in progress has been described. However, other than that, the message to be prioritized can be changed in accordance with the state of various vehicles. For example, when diag processing is being performed, messages related to the diag can be prioritized, when plug-in charging is in progress, messages related to external charging can be prioritized, when the vehicle is parked or stopped and is unused, the message required for that state can be prioritized, and in a state where an ECU software update process (OTA) is being performed wirelessly, the message required for the update process can be prioritized. Such priority changes in accordance with the priority target can be easily realized by appropriately rewriting the content stored in the storage unit of the virtualization mechanism, and can be made to flexibly correspond in accordance with the number and types of applications implemented in the virtual machine.

Further, according to the control device according to the present embodiment, since the HSM only needs to perform the encryption process of the messages registered via the virtualization mechanism in order, the existing HSM can be used as it is. Further, in the communication software implemented in the virtual machine, since the message registration destination (storage destination) is only changed from the HSM to the virtual HSM and the control is not changed, a large-scale modification is not required.

The priority of the present embodiment shows an example that defines the priority relationship between the transmission message and the received message, the priority relationship for each application (A, B, C), and the priority relationship for each application type (control system, multimedia system). However, in addition to this definition, a priority relationship may be defined for each virtual machine. For example, a priority relationship such as virtual machine 31>virtual machine 32>virtual machine 33 can be considered. Examples of the priority setting method include a method of giving an absolute priority relationship (app A: medium, app B: high, app C: low) and a method of giving a relative priority relationship (app B>app A, app B>app C, app A>app C), and the like, as an example.

Although one embodiment of the technique of the present disclosure has been described above, the present disclosure can be interpreted as a control method executed by a control device including a processor and a memory, a control program of the method, a computer-readable, non-transitory storage medium that stores the control program, or a vehicle on which the control device is mounted, for example, in addition to the control device.

The present disclosure can be used as a control device mounted on a vehicle.

What is claimed is:

1. A control device that is mounted on a vehicle, the control device comprising:
   a processor;
   a memory; and
   circuitry configured to:
      acquire a plurality of transmit messages transmitted from each of a plurality of applications of the vehicle and a plurality of receive messages received by each of the plurality of applications;
      acquire a state of the vehicle; and
      store, in the memory, a priority order for an encryption process of the plurality of transmit messages and a decryption process of the plurality of receive messages for a first application and a second application of the plurality of applications, wherein the first application is associated with a first control system of the vehicle other than a second control system for autonomously driving the vehicle, and wherein the second application is associated with the second control system for autonomously driving the vehicle, wherein:
  when the state of the vehicle is a first state, the priority of the encryption process of the plurality of transmit messages of the second application is higher than the priority of the decryption process of the plurality of receive messages of the first application, the first state being when the vehicle is autonomously driving; and
  when the state of the vehicle is a second state other than the first state, the priority of the encryption process of the plurality of transmit messages of the first application is higher than the priority of the decryption process of the plurality of receive messages of the second application, the second state being when the vehicle is not autonomously driving.

2. A vehicle equipped with the control device according to claim 1.

3. The control device according to claim 1, wherein the plurality of transmit messages and the plurality of receive messages of the first application are stored in a first virtual hardware security module (HSM) of the first control system and the plurality of transmit messages and the plurality of receive messages of the second application are stored in a second virtual HSM of the second control system.

4. The control device according to claim 1, wherein the control device communicates with at least the first control system and the second control system.

5. The control device according to claim 1, wherein the first control system and the second control system each comprise at least one virtual machine.

6. The control device according to claim 1, wherein the control device further comprises an acquisition unit and an arbitration unit.

7. The control device according to claim 1, wherein the control device communicates with a hardware security module (HSM) of a system-on-a-chip (SoC) of the vehicle.

8. The control device according to claim 1, wherein the control device communicates with at least one multimedia system of the vehicle.

9. A control method that is performed by circuitry of a control device mounted on a vehicle, the control method comprising:
  acquiring a plurality of transmit messages transmitted from each of a plurality of applications of the vehicle and a plurality of receive messages received by each of the plurality of applications;
  acquiring a state of the vehicle; and
  storing, in a memory of the control device, a priority order for an encryption process of the plurality of transmit messages and a decryption process of the plurality of receive messages for a first application and a second application of the plurality of applications, wherein the first application is associated with a first control system of the vehicle other than a second control system for autonomously driving the vehicle, and wherein the second application is associated with the second control system for autonomously driving the vehicle, wherein:
  when the state of the vehicle is a first state, the priority of the encryption process of the plurality of transmit messages of the second application is higher than the priority of the encryption process of the plurality of transmit messages of the first application, the priority of the decryption process of the plurality of receive messages of the second application is higher than the priority of the decryption process of the plurality of receive messages of the first application, and the priority of the encryption process of the plurality of transmit messages of the first application and the second application is higher than the priority of the decryption process of the plurality of receive messages of the first application and the second application, the first state being when the vehicle is autonomously driving; and
  when the state of the vehicle is a second state other than the first state, the priority of the encryption process of the plurality of transmit messages of the first application is higher than the priority of the encryption process of the plurality of transmit messages of the second application, the priority of the decryption process of the plurality of receive messages of the first application is higher than the priority of the decryption process of the plurality of receive messages of the second application, and the priority of the encryption process of the plurality of transmit messages of the first application and the second application is higher than the priority of the decryption process of the plurality of receive messages of the first application and the second application, the second state being when the vehicle is not autonomously driving.

10. The control method according to claim 9, wherein the plurality of transmit messages and the plurality of receive messages of the first application are stored in a first virtual hardware security module (HSM) of the first control system and the plurality of transmit messages and the plurality of receive messages of the second application are stored in a second virtual HSM of the second control system.

11. The control method according to claim 9, wherein the control device communicates with the first control system and the second control system and at least one multimedia system of the vehicle.

12. The control method according to claim 9, wherein the first control system and the second control system each comprise at least one virtual machine.

13. The control method according to claim 9, wherein the control device further comprises an acquisition unit and an arbitration unit.

14. The control method according to claim 9, wherein the control device communicates with a hardware security module (HSM) of a system-on-a-chip (SoC) of the vehicle.

15. A non-transitory computer-readable medium storing instructions that, when executed by one or more processors of a control device that is mounted on a vehicle, cause the control device to:
  acquire a plurality of transmit messages transmitted from each of a plurality of applications of the vehicle and a plurality of receive messages received by each of the plurality of applications;
  acquire a state of the vehicle; and
  store, in a memory of the control device, a priority order for an encryption process of the plurality of transmit messages and a decryption process of the plurality of receive messages for a first application and a second application of the plurality of applications, wherein the first application is associated with a first control system of the vehicle other than a second control system for autonomously driving the vehicle, and wherein the second application is associated with the second control system for autonomously driving the vehicle, wherein:

when the state of the vehicle is a first state, the priority of the encryption process of the plurality of transmit messages of the second application is higher than the priority of the decryption process of the plurality of receive messages of the first application, the first state being when the vehicle is autonomously driving; and when the state of the vehicle is a second state other than the first state, the priority of the encryption process of the plurality of transmit messages of the first application is higher than the priority of the decryption process of the plurality of receive messages of the second application, the second state being when the vehicle is not autonomously driving.

16. The non-transitory computer-readable medium according to claim 15, wherein the plurality of transmit messages and the plurality of receive messages of the first application are stored in a first virtual hardware security module (HSM) of the first control system and the plurality of transmit messages and the plurality of receive messages of the second application are stored in a second virtual HSM of the second control system.

17. The non-transitory computer-readable medium according to claim 15, wherein the control device communicates with the first control system and the second control system and at least one multimedia system of the vehicle.

18. The non-transitory computer-readable medium according to claim 15, wherein the first control system and the second control system each comprise at least one virtual machine.

19. The non-transitory computer-readable medium according to claim 15, wherein the control device further comprises an acquisition unit and an arbitration unit.

20. The non-transitory computer-readable medium according to claim 15, wherein the control device communicates with a hardware security module (HSM) of a system-on-a-chip (SoC) of the vehicle.

* * * * *